US012296601B2

(12) United States Patent
Watanabe et al.

(10) Patent No.: US 12,296,601 B2
(45) Date of Patent: May 13, 2025

(54) LIQUID STORAGE CONTAINER AND PRINTING APPARATUS

(71) Applicant: CANON KABUSHIKI KAISHA, Tokyo (JP)

(72) Inventors: Makoto Watanabe, Kanagawa (JP); Junichiro Iri, Kanagawa (JP); Naruyuki Nojo, Kanagawa (JP); Isao Otani, Kanagawa (JP); Hiroaki Kusano, Tokyo (JP); Satoru Takahashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 86 days.

(21) Appl. No.: 18/319,427

(22) Filed: May 17, 2023

(65) Prior Publication Data

US 2024/0269987 A1 Aug. 15, 2024

(30) Foreign Application Priority Data

Jun. 10, 2022 (JP) ................................ 2022-094125
Feb. 17, 2023 (JP) ................................ 2023-023529

(51) Int. Cl.
*B41J 2/175* (2006.01)

(52) U.S. Cl.
CPC ....... *B41J 2/17596* (2013.01); *B41J 2/17513* (2013.01); *B41J 2/17523* (2013.01)

(58) Field of Classification Search
CPC .... B41J 2/175; B41J 2/17503; B41J 2/17506; B41J 2/17509; B41J 2/17513;
(Continued)

(56) References Cited

U.S. PATENT DOCUMENTS 5,221,935 A 6/1993 Uzita ......................... B41J 2/17
6,158,851 A * 12/2000 Zepeda .................... B41J 2/175 347/85

(Continued)

FOREIGN PATENT DOCUMENTS

| | | |
|---|---|---|
| JP | H05-4349 | 1/1993 |
| JP | 2002-178544 | 6/2002 |

OTHER PUBLICATIONS

U.S. Appl. No. 18/324,095, filed May 25, 2023.
U.S. Appl. No. 18/296,692, filed Apr. 6, 2023.
U.S. Appl. No. 18/353,828, filed Jul. 17, 2023.

*Primary Examiner* — Anh T Vo
(74) *Attorney, Agent, or Firm* — Venable LLP

(57) ABSTRACT

Provided is a technique in which liquid leaking in attachment and detachment of a liquid storage container to and from a printing apparatus can be retained with a simple, space-saving configuration. The liquid storage container can be attached to the printing apparatus. The liquid storage container includes a storage portion that stores the liquid, a supply port that supplies the liquid stored in the storage portion to the printing apparatus, and a liquid retaining portion that is capable of retaining the liquid leaking in the attachment and detachment of the liquid storage container to and from the printing apparatus by using capillary force. The liquid retaining portion extends along an outer peripheral surface of the supply port, in an attachment direction in which the liquid storage container is attached to the printing apparatus.

18 Claims, 12 Drawing Sheets

(58) Field of Classification Search
CPC .. B41J 2/1752; B41J 2/17523; B41J 2/17553; B41J 2/17596; B41J 29/13
See application file for complete search history.

(56) References Cited

U.S. PATENT DOCUMENTS

| | | | | |
|---|---|---|---|---|
| 6,540,342 | B2 | 4/2003 | Koshikawa et al. | B41J 2/175 |
| 2016/0263902 | A1 * | 9/2016 | Kimura | B41J 2/17509 |
| 2021/0370682 | A1 | 12/2021 | Murakami et al. | B41J 2/175 |
| 2022/0363066 | A1 | 11/2022 | Ojima et al. | B41J 2/175 |
| 2022/0396089 | A1 | 12/2022 | Okuyama et al. | B43K 11/00 |

* cited by examiner

LIQUID STORAGE CONTAINER AND PRINTING APPARATUS

BACKGROUND OF THE INVENTION

Field of the Invention

A technique of the present disclosure relates to a liquid storage container and a printing apparatus.

Description of the Related Art

Japanese Patent Laid-Open No. H05-4349 discloses an ink cartridge (also referred to as "liquid storage container") including a waste ink absorber (also referred to as "liquid retaining member") that absorbs ink leaking in removal from an inkjet printing apparatus (also referred to as "printing apparatus"). In Japanese Patent Laid-Open No. H05-4349, the waste ink absorber is laid over an entire area below (gravity direction side) an ink bag arranged in the ink cartridge.

Japanese Patent Laid-Open No. 2002-178544 discloses an ink reabsorbing member that extends inside a supply port portion included in a liquid storage container, from the supply port portion in a counter-gravity direction and a gravity direction and that absorbs ink remaining in the supply port portion by using capillary force in attachment and detachment of the liquid storage container to and from a printing apparatus.

Even if liquid should leak in attachment and detachment of a non-replenishable liquid storage container to and from a printing apparatus, a leakage amount for this liquid storage container is limited to a certain amount. Accordingly, providing an unnecessary-large liquid retaining member in the liquid storage container may lead to wasting of manufacturing cost. Furthermore, the liquid storage container according to Japanese Patent Laid-Open No. H05-4349 requires a communication groove that guides the leaking ink to the liquid retaining member. Thus, a space for arranging the communication groove is necessary in the liquid storage container.

The ink reabsorbing member according to Japanese Patent Laid-Open No. 2002-178544 extends from the supply port portion in the counter-gravity direction and the gravity direction. Thus, in the case where there is no space to extend the liquid retaining member from the supply port portion in the counter-gravity direction or the gravity direction, absorbing of the leaking liquid may be difficult.

Accordingly, an object of the present disclosure is to provide a technique in which liquid leaking in attachment and detachment of a liquid storage container to and from a printing apparatus can be retained with a simple, space-saving configuration.

SUMMARY OF THE INVENTION

A liquid storage container according to the present disclosure for achieving the above object is a liquid storage container attachable to a printing apparatus, having: a storage portion that stores liquid; a supply port that supplies the liquid stored in the storage portion to the printing apparatus; and a liquid retaining portion that is capable of retaining the liquid leaking in attachment and detachment of the liquid storage container to and from the printing apparatus by using capillary force, in which the liquid retaining portion extends along an outer peripheral surface of the supply port, in an attachment direction in which the liquid storage container is attached to the printing apparatus.

Further features of the present invention will become apparent from the following description of exemplary embodiments with reference to the attached drawings.

DESCRIPTION OF THE EMBODIMENTS

Embodiment 1

<Printing Apparatus 100>

Figure 1:
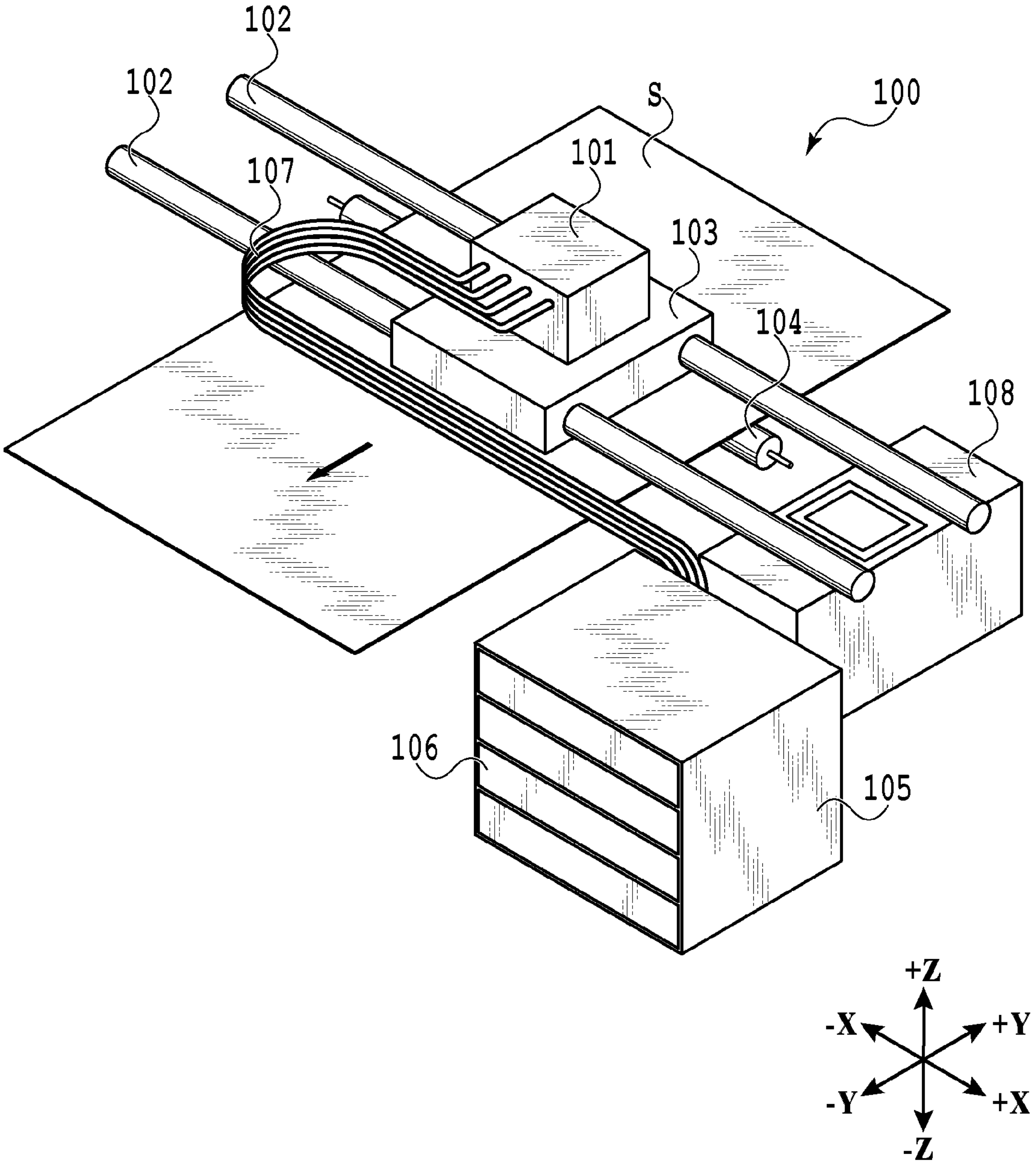
FIG. 1 is a perspective diagram illustrating an outline configuration of a printing apparatus in one embodiment.

FIG. 1 is a perspective diagram illustrating an outline configuration of a printing apparatus 100 in the present embodiment. As illustrated in FIG. 1, the printing apparatus 100 includes a print head 101, guide rails 102, a carriage 103, a conveyance roller 104, a liquid supply unit 105, trays 106, liquid supply tubes 107, and a recovery unit 108.

In the present embodiment, an attachment direction in which a liquid storage container 200 (see FIG. 2) to be arranged in an interior of each tray 106 is attached to the printing apparatus 100 is set to a +Y direction. Meanwhile, a direction in which the liquid storage container 200 is removed from the printing apparatus 100 is set to a −Y direction. Moreover, a width direction of the liquid storage container 200 (that is a direction orthogonal to the Y direction on a plane) is set to +X directions. Furthermore, a gravity direction (downward direction) is set to a −Z direction, and a counter-gravity direction (upward direction) is set to a +Z direction.

The printing apparatus 100 repeats reciprocation movement (main scanning) of the print head 101 and conveyance (sub-scanning) per predetermined pitch of a printing sheet S that is a print medium. The printing apparatus 100 is an apparatus that executes a printing operation by selectively ejecting multiple types of liquids from the print head 101 in synchronization with these movements and causing the liquids to land on the printing sheet S that is the print medium. Examples of the printing operation include formation of characters, symbols, images, combination of these, or the like. Note that any medium may be used as the print medium as long as characters or the like can be formed by causing liquid droplets to land on the medium. For example, media of various materials and forms such as paper, cloth, a label surface of an optical disc, a plastic sheet, an OHP sheet, and an envelope may be used as the print medium.

In FIG. 1, the print head 101 is mounted on the carriage 103 in an attachable and detachable manner, the carriage 103 slidably supported on the two guide rails 102 and made to reciprocate in a straight line along the guide rails 102 by a not-illustrated driving unit such as a motor. The printing sheet S that faces a liquid ejection surface of the print head 101 and that receives the liquids ejected from liquid ejection units of the print head 101 is conveyed by the conveyance roller 104 that is a conveyance unit, in a direction (that is in the direction of the arrow in FIG. 1) intersecting a movement direction of the carriage 103. The print head 101 includes multiple nozzle arrays used to perform printing by ejecting different types of liquids, respectively, as the multiple liquid ejection units. Note that the different types of liquids may be inks of different colors or inks of the same color with different characteristics such as a pigment ink and a dye ink.

The multiple trays 106 each configured to house the liquid storage container 200 are attached to the liquid supply unit 105 in an attachable and detachable manner. The liquid supply unit 105 and the print head 101 are connected to each other by the multiple liquid supply tubes 107 corresponding to the respective types of liquids. Attaching the liquid storage containers 200 to the liquid supply unit 105 allows the respective types of liquids stored in the liquid storage containers 200 to be independently supplied to the respective nozzle arrays of the print head 101.

In a non-printing region that is a region within a reciprocation movement range of the print head 101 and outside a passing range of the printing sheet S, the recovery unit 108 is arranged to face the liquid ejection surface of the print head 101. The recovery unit 108 includes a cap portion for capping the liquid ejection surface of the print head 101, a suction mechanism for forcedly sucking the liquid with the liquid ejection surface capped, a cleaning blade for wiping soiling on the liquid ejection surface, and the like. This suction operation is performed by the recovery unit 108 before the printing operation of the printing apparatus 100. This operation can remove remaining air bubbles in the ejection units of the print head 101 and liquids with increased viscosity near ejection ports and maintain ejection characteristics of the print head 101 also in the case where the printing apparatus 100 is operated after being left to stand for a long period.

<Liquid Storage Container 200>

Figure 2:
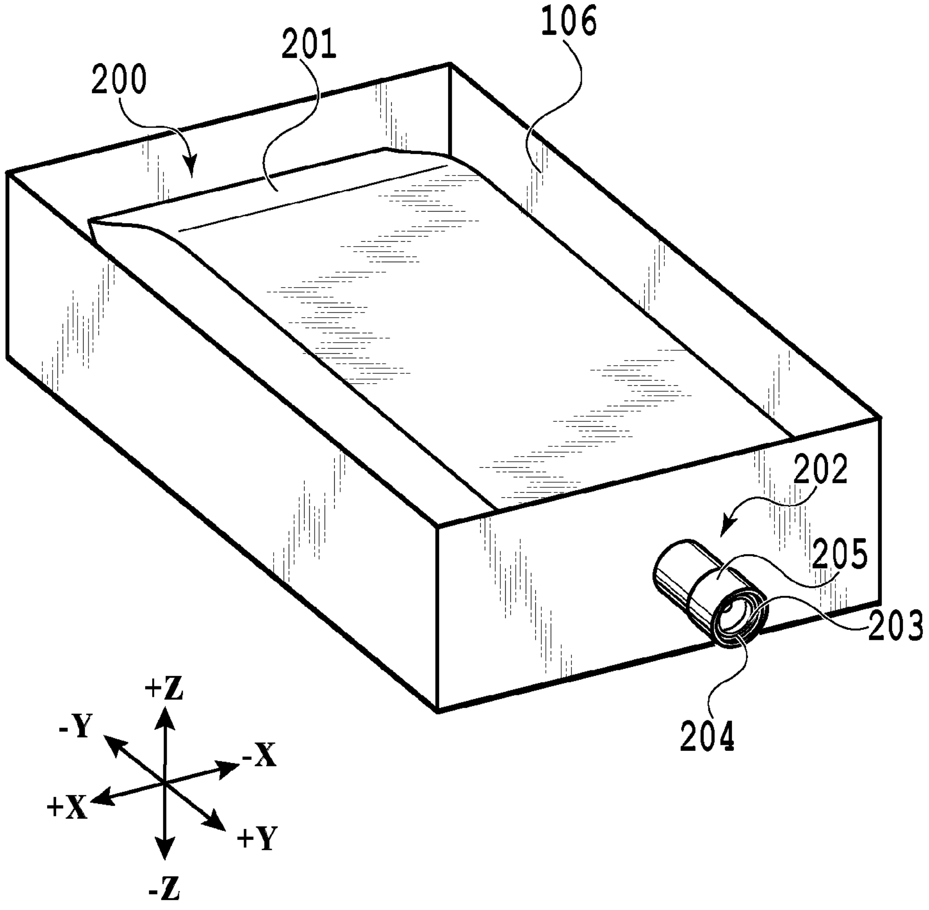
FIG. 2 is a perspective diagram schematically illustrating an interior of each tray in one embodiment.

FIG. 2 is a perspective diagram schematically illustrating an interior of each tray 106 in the present embodiment. As illustrated in FIG. 2, the liquid storage container 200 is arranged in the interior of the tray 106 in an attachable and detachable manner. The liquid storage container 200 includes a storage portion 201 that stores the liquid and a supply portion 202 that supplies the liquid to the printing apparatus 100 (see FIG. 1). The supply portion 202 includes a supply port 203, a liquid retaining member 204, and a cover portion 205.

The liquid storage container 200 is independently provided for each type of liquid stored in the storage portion 201. Connecting the supply portion 202 to a connection portion of the printing apparatus 100 allows the liquid stored in the storage portion 201 to be supplied to the printing apparatus 100. In the present embodiment, the supply portion 202 extends from the storage portion 201 in the attachment direction in which the liquid storage container 200 is attached to the printing apparatus 100. The liquid retaining member 204 is arranged on an outer peripheral surface of the supply port 203, the liquid retaining member 204 capable of retaining leaked liquid by causing capillary action and absorbing the leaked liquid in a case where the liquid storage container 200 is attached to the printing apparatus 100.

The liquid retaining member 204 extends along the outer peripheral surface of the supply port 203, in the attachment direction in which the liquid storage container 200 is attached to the printing apparatus 100. The liquid retaining member 204 includes a fibrous body. For example, polypropylene, high-density polyethylene, a mixed agent of these materials, or the like can be preferably used as the fibrous body. Moreover, in the present embodiment, the cover portion 205 covering the supply port 203 and the liquid retaining member 204 is formed on the outer peripheral surface of the supply port 203.

Figure 3:
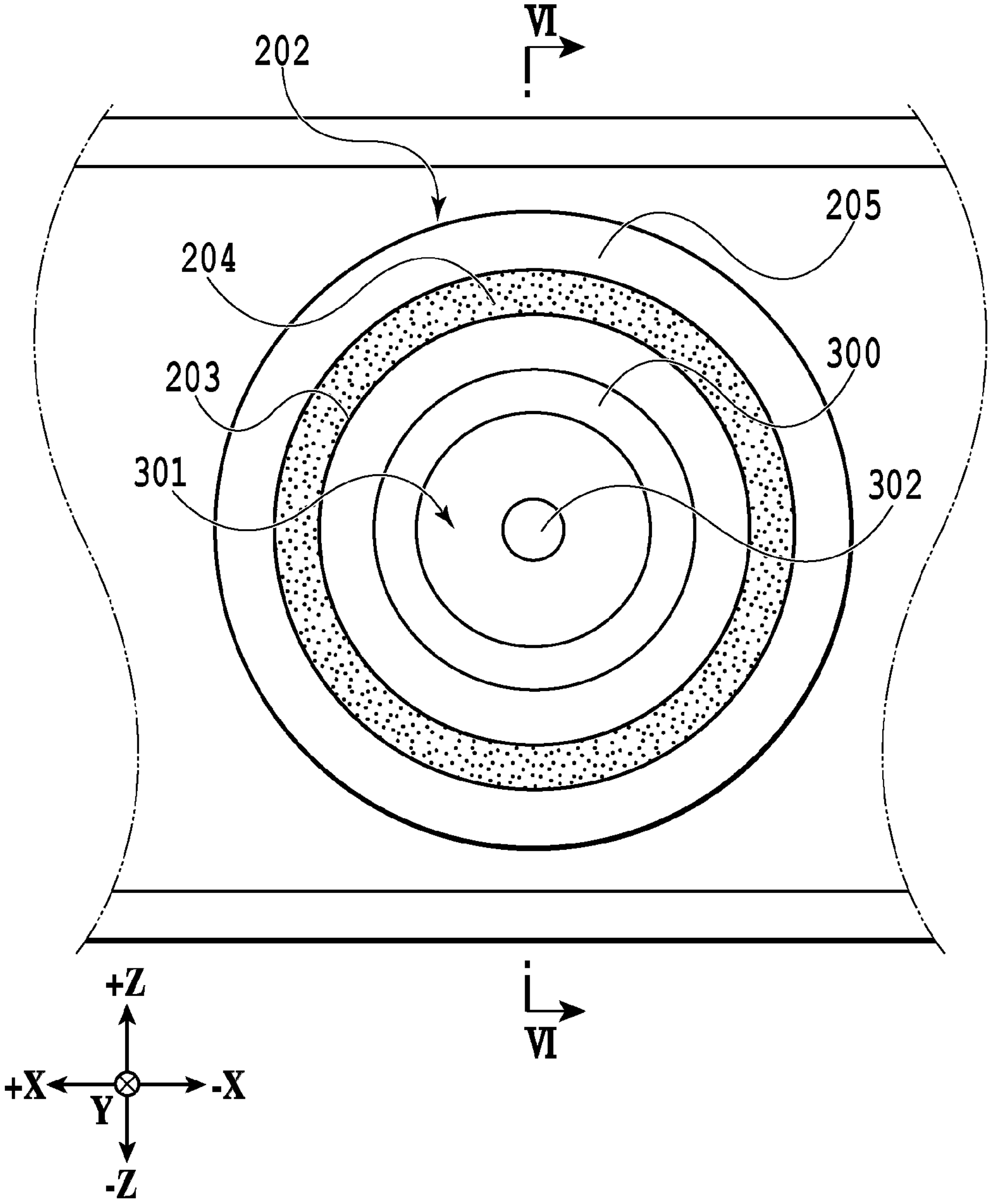
FIG. 3 is a schematic front diagram of a supply portion in one embodiment.

FIG. 3 is a schematic front diagram of the supply portion 202 in the present embodiment. As illustrated in FIG. 3, the supply portion 202 includes a sealing member 300 that seals an interior of the supply port 203. A through hole 301 penetrating the sealing member 300 in the attachment direction (Y direction) is formed in the sealing member 300. Note that, in FIG. 3, a valve element 302 that closes the through hole 301 can be viewed.

Moreover, the liquid retaining member 204 is press-fitted into a gap between the outer peripheral surface of the supply port 203 and an inner peripheral surface of the cover portion 205 in an opposite direction to the attachment direction (that is in a depth direction in FIG. 3). In the present embodiment, the liquid retaining member 204 is arranged in an annular shape along the outer peripheral surface of the supply port 203.

Figure 4:
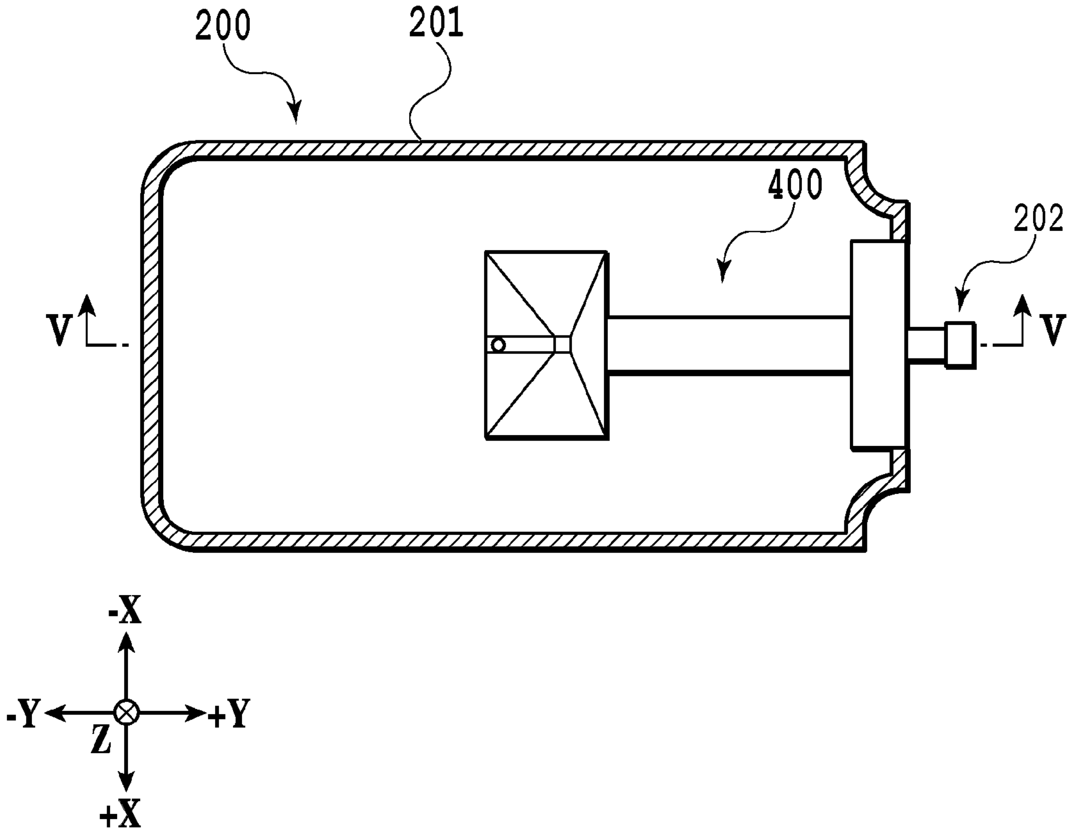
FIG. 4 is a schematic plan diagram illustrating an interior of a liquid storage container in one embodiment.

FIG. 4 is a schematic plan diagram illustrating an interior of the liquid storage container 200 in the present embodiment. In FIG. 4, the liquid storage container 200 is illustrated in an orientation in which the liquid storage container 200 is attached to the printing apparatus 100 (see FIG. 1). As illustrated in FIG. 4, a flow passage unit 400 is arranged in an interior of the storage portion 201 and, in the flow passage unit 400, a flow passage allowing an interior and an exterior of the storage portion 201 to communicate with each other is formed. The supply portion 202 is formed on the distal end side of the flow passage unit 400 in the attachment direction.

Figure 5:
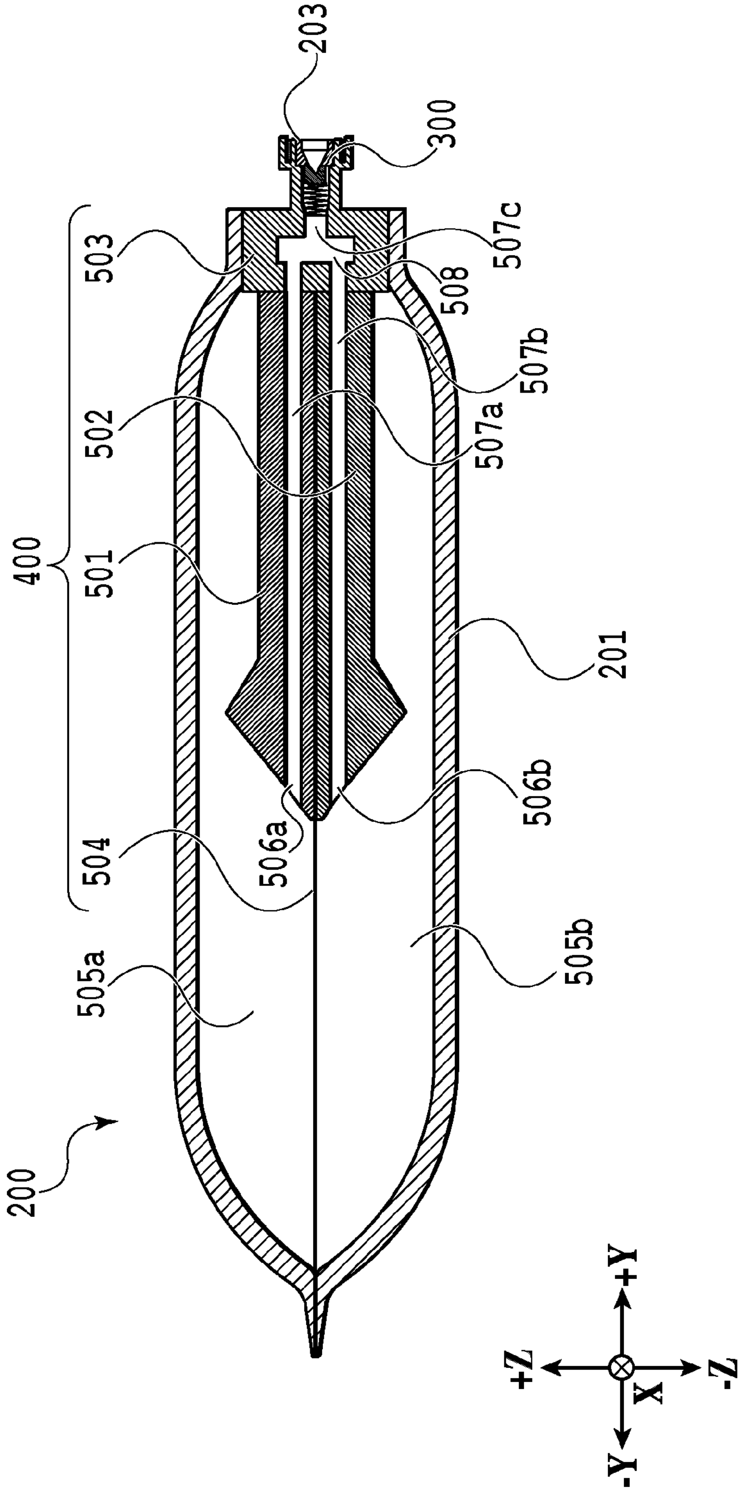
FIG. 5 is a schematic cross-sectional diagram along the V-V line in FIG. 4.

FIG. 5 is a schematic cross-sectional diagram along the V-V line in FIG. 4. As illustrated in FIG. 5, the flow passage unit 400 includes a first flow passage member 501, a second flow passage member 502, a third flow passage member 503, and a partition member 504. The first flow passage member 501 is located on the upper side in the gravity direction. The second flow passage member 502 is located on the lower side in the gravity direction. The partition member 504 extending in a horizontal direction is interposed between the first flow passage member 501 and the second flow passage member 502. The partition member 504 is interposed and fixed between the first flow passage member 501 and the second flow passage member 502, and thereby partitions the interior of the storage portion 201 into a first storage chamber 505*a* on the upper side in the gravity direction and a second storage chamber 505*b* on the lower side in the gravity direction. The third flow passage member 503 is joined to the distal end side of the first flow passage member 501 and the second flow passage member 502 in the attachment direction and, in the third flow passage member 503, a flow passage that causes the liquid guided by the first flow passage member 501 and the liquid guided by the second flow passage member 502 to merge and further flow toward the distal end side is formed. According to such a configuration, it is possible to substantially halve the length (that is height) of each chamber storing the liquid in the gravity direction, from that in a liquid storage container having an equivalent size and including no partition member 504, and reduce a density difference in a direction in which sedimentation of the liquid occurs.

A first introduction portion 506*a* into which the liquid stored in the first storage chamber 505*a* is introduced and a first flow passage 507*a* that guides the introduced liquid toward the third flow passage member 503 are formed in the first flow passage member 501. A second introduction portion 506*b* into which the liquid stored in the second storage chamber 505*b* is introduced and a second flow passage 507*b* that guides the introduced liquid toward the third flow passage member 503 are formed in the second flow passage member 502.

A merging portion 508 in which the liquid guided from the first flow passage 507*a* and the liquid guided from the second flow passage 507*b* merge and a third flow passage 507*c* that continuously extends from the merging portion 508 in the attachment direction are formed in the third flow passage member 503. The liquid having merged in the merging portion 508 is guided to the third flow passage 507*c*. An opening portion of the third flow passage 507*c* is sealed by the sealing member 300.

The supply port 203 extends from a front surface (surface facing the +Y direction in FIG. 5) of a base portion of the third flow passage member 503 in the attachment direction. The sealing member 300 described above is press-fitted from an opening of the supply port 203 in the opposite direction (that is in the −Y direction in FIG. 5) to the attachment direction. The liquid thereby does not flow to the distal end side of the opening of the third flow passage 507*c* in the attachment direction, in a state where the liquid storage container 200 is not attached to the printing apparatus 100.

Figure 6:
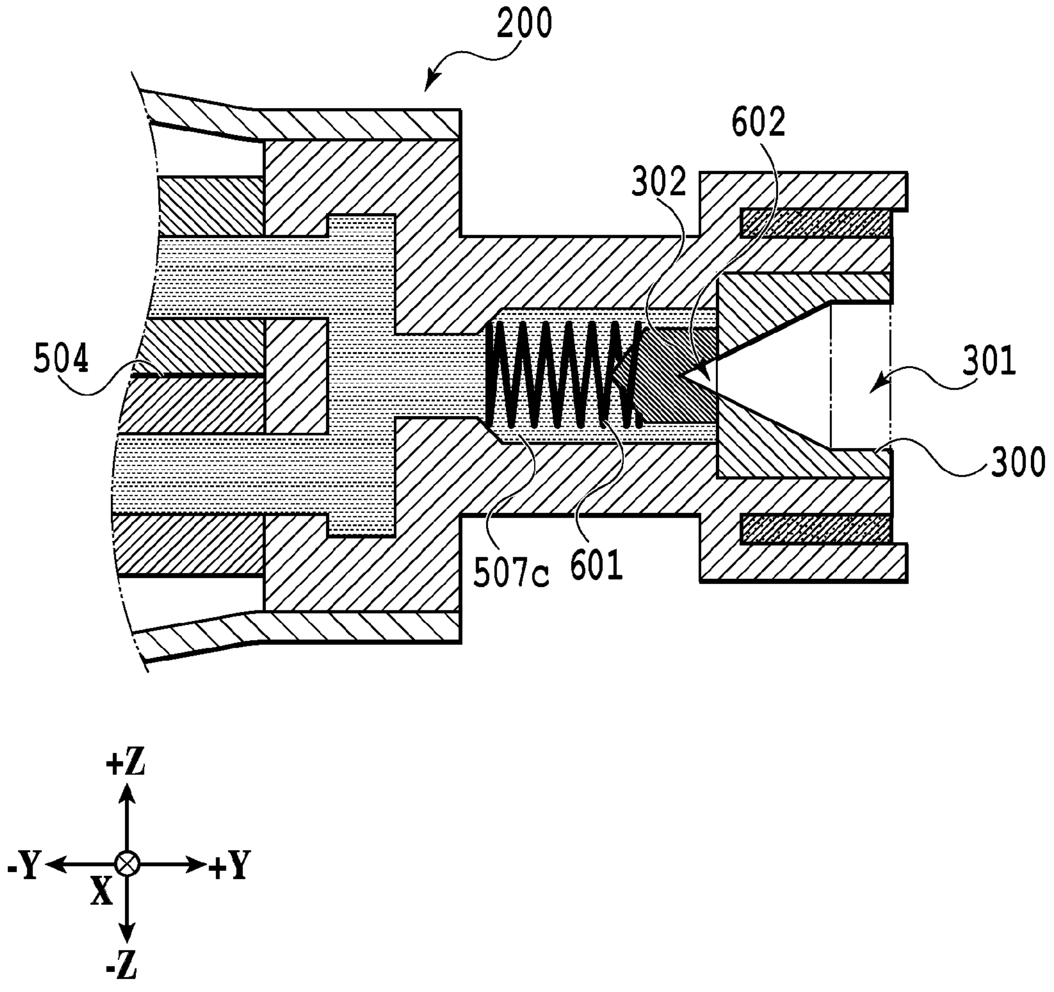
FIG. 6 is a schematic cross-sectional diagram along the VI-VI line in FIG. 3.

FIG. 6 is a schematic cross-sectional diagram along the VI-VI line in FIG. 3. As illustrated in FIG. 6, the valve element 302 and a coil spring 601 that is an elastic member are arranged in the third flow passage 507*c*. One end of the coil spring 601 is fixed to a base end portion in the third flow passage 507*c*, and the other end is fixed to the valve element 302. The valve element 302 is biased in the attachment direction (rightward in FIG. 6) by the coil spring 601. The valve element 302 comes into contact with a peripheral edge portion of the through hole 301 from the back surface side (that is a surface facing in the −Y direction) of the sealing member 300, and thereby closes the through hole 301. A fitting portion 602 to which a tip portion 801 (see FIG. 8B) of a hollow needle 701 arranged in a connection unit 700 (see FIG. 7) is to be fitted is formed on the surface of the valve element 302 that closes the sealing member 300. Note that the shape of the fitting portion 602 corresponds to the shape of the tip portion 801. The inner diameter of the through hole 301 on the base end side in the attachment direction is different from that on the distal end side. Although the diameter of the through hole 301 gradually increases from the base end side toward the distal end side in the attachment direction up to a middle position, the diameter is maintained the same from the middle position.

In a state where the liquid storage container 200 is not attached to the printing apparatus 100, the opening of the third flow passage 507*c* is sealed by the sealing member 300 except for the through hole 301. Closing the through hole 301 with the valve element 302 completely closes the opening of the third flow passage 507*c*. Given that the valve element 302 biased by the coil spring 601 comes into contact with the sealing member 300 and thereby closes the through hole 301, the sealing member 300 preferably has such a level of stiffness that the sealing member 300 can withstand pressing pressure from the valve element 302.

Figure 7:
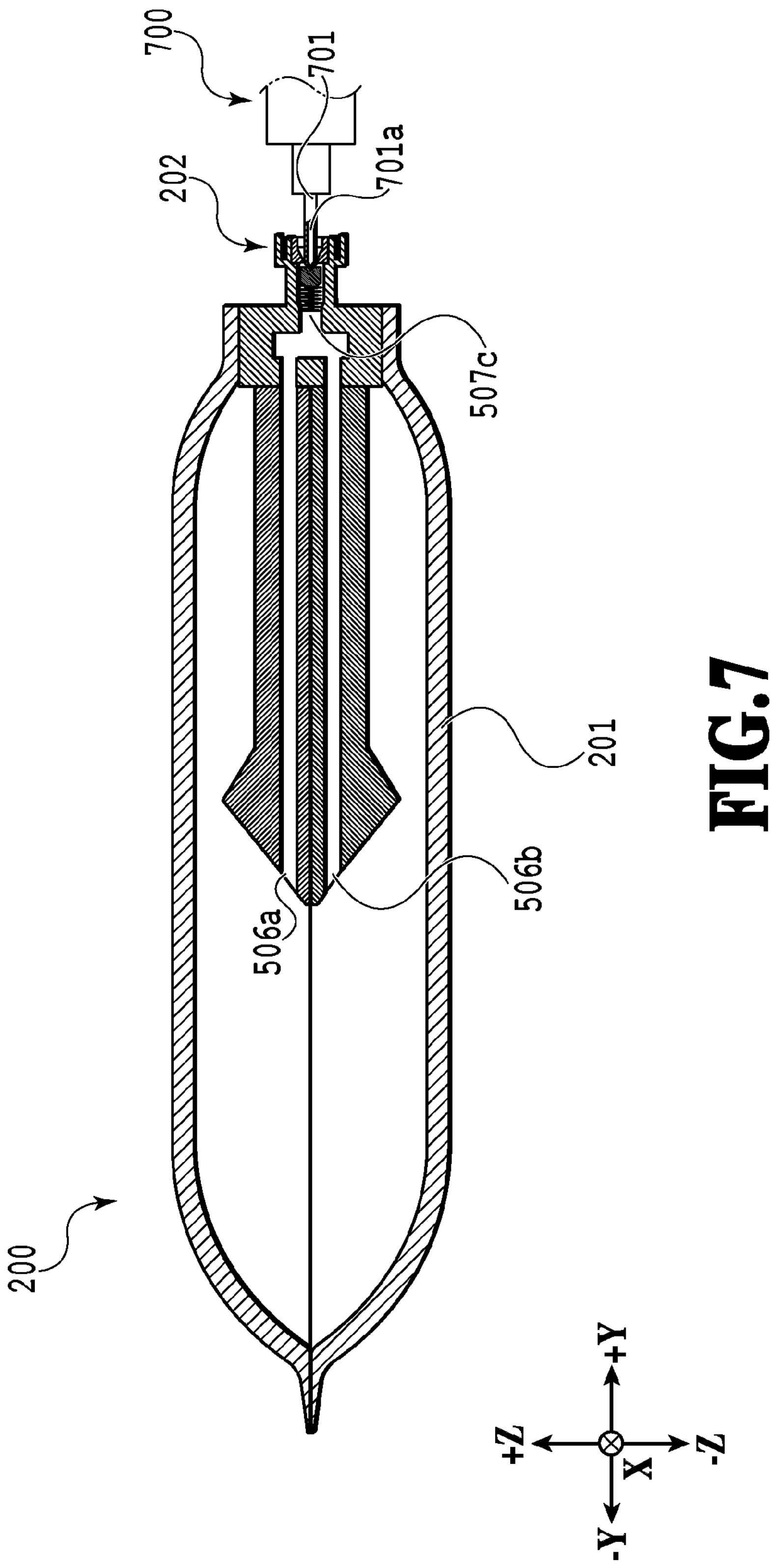
FIG. 7 is a schematic cross-sectional diagram illustrating a state where the liquid storage container in one embodiment is attached to the printing apparatus.

FIG. 7 is a schematic cross-sectional diagram illustrating a state where the liquid storage container 200 in the present embodiment is attached to the printing apparatus 100 (see FIG. 1). A pump mechanism (not illustrated) that sucks the liquid stored in the liquid storage container 200 is arranged in the printing apparatus 100. In the case where the aforementioned printing operation is executed, the liquid in the liquid storage container 200 is sucked into the printing apparatus 100 by negative pressure generated by suction of the pump mechanism. A flow of the liquid from the liquid storage container 200 to the printing apparatus 100 is thereby generated.

The liquid supply unit 105 (see FIG. 1) included in the printing apparatus 100 includes the connection unit 700 to which the supply portion 202 of the liquid storage container 200 can be connected, in the interior. The connection unit 700 includes the hollow needle 701 that extends from a main body of the connection unit 700 in the opposite direction to the attachment direction. An interior of the hollow needle 701 is hollow, and a hollow flow passage 701*a* is formed. Moreover, an introduction port (not illustrated) that introduces the liquid from the outside of the hollow needle 701 into the hollow flow passage 701*a* is formed in the hollow needle 701.

The connection unit 700 functions as a connection unit with the supply portion 202 included in the liquid storage container 200. Connecting the supply portion 202 included in the liquid storage container 200 to the connection unit 700 included in the printing apparatus 100 can cause the hollow needle 701 included in the printing apparatus 100 to be inserted into the interior of the third flow passage 507*c* included in the liquid storage container 200 relative to the third flow passage 507*c*. Inserting the hollow needle 701 into the third flow passage 507*c* allows the liquid guided from the first introduction portion 506*a* and the second introduction portion 506*b* included in the liquid storage container 200 to the third flow passage 507*c* to be introduced into the hollow flow passage 701*a* included in the printing apparatus 100. Thus, according to such a configuration, it is possible to supply the liquid stored in the liquid storage container 200 to the print head 101 via the connection unit 700 and the liquid supply tube 107 included in the printing apparatus 100.

<Retaining of Liquid>

Figure 8A:
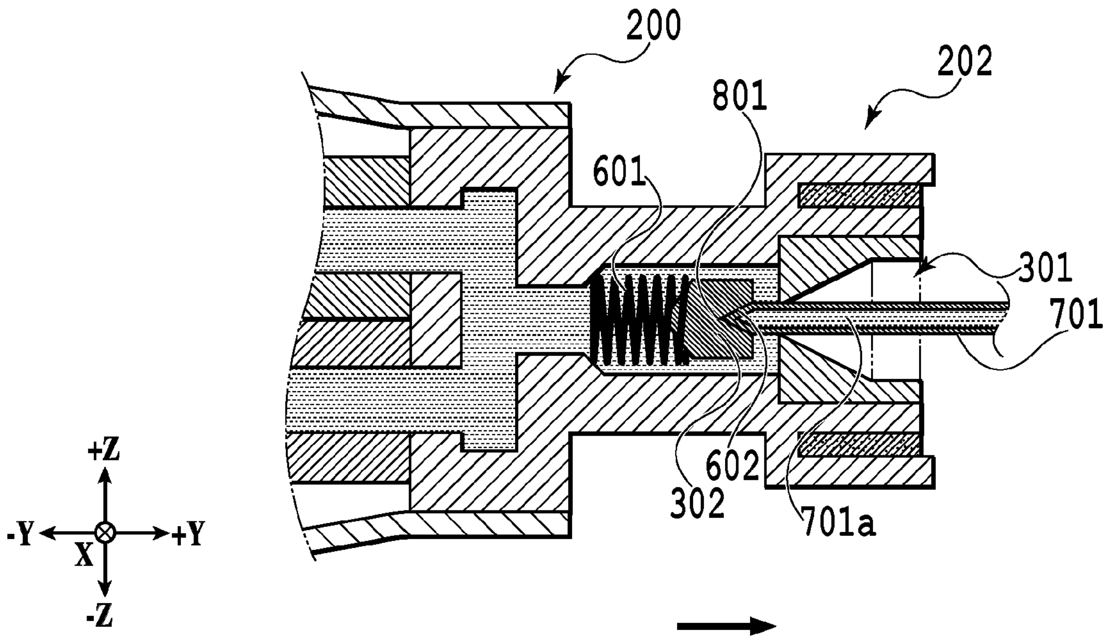
FIGS. 8A and 8B are schematic enlarged cross-sectional diagrams illustrating processes of attaching and detaching the liquid storage container of one embodiment to and from the printing apparatus.
Figure 8B:
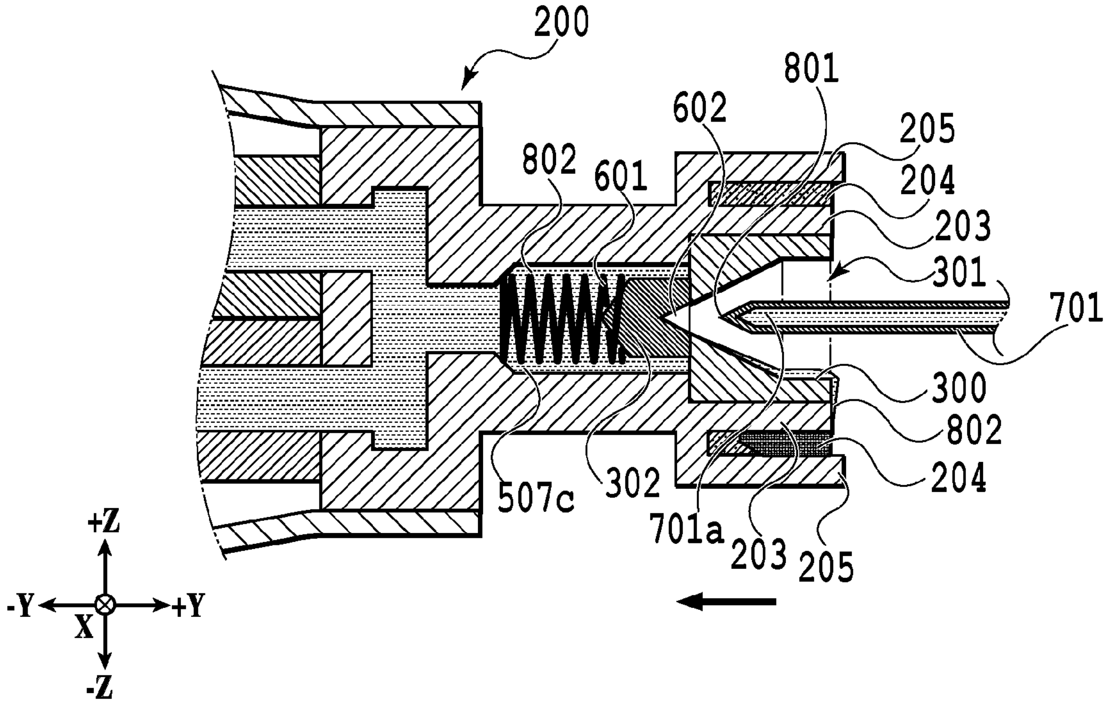

FIGS. 8A and 8B are schematic enlarged cross-sectional diagrams illustrating processes of attaching and detaching the liquid storage container 200 in the present embodiment to and from the printing apparatus 100 (see FIG. 1). FIG. 8A illustrates a state where the liquid storage container 200 is attached to the printing apparatus 100. The arrow illustrated in a lower right portion of FIG. 8A illustrates the attachment direction in which the liquid storage container 200 is attached to the printing apparatus 100. As illustrated in FIG. 8A, the hollow needle 701 includes the tip portion 801 pointed in the opposite direction to the attachment direction. In an attachment process, the supply portion 202 of the liquid storage container 200 is connected to the connection unit 700 of the printing apparatus 100, and the tip portion 801 of the hollow needle 701 included in the printing apparatus 100 is thereby fitted to the fitting portion 602 formed in the valve element 302 included in the liquid storage container 200. Then, the valve element 302 pressed by the hollow needle 701 is moved in the opposite direction to the attachment direction against biasing force of the coil spring 601. The valve element 302 is thereby separated from the sealing member 300 and, in the third flow passage 507*c*, the liquid flows into the hollow flow passage 701*a* from the introduction port (not illustrated) of the hollow needle 701. The liquid can thereby flow into an interior of the main body of the connection unit 700 via the hollow flow passage 701*a*. Specifically, a flow passage through which the liquid is supplied from liquid storage container 200 to the printing apparatus 100 can be formed by inserting the hollow needle 701 into the through hole 301 and moving the valve element 302. The state illustrated in FIG. 8A is a state where the hollow needle 701 is tightly fitted to a hole portion of the through hole 301 with the smaller inner diameter. According to such a configuration, it is possible to suppress leakage of the liquid from a gap between the hollow needle 701 and the through hole 301 in the attachment of the liquid storage container 200 to the printing apparatus 100 while allowing supply of the liquid to the printing apparatus 100.

Thereafter, in the case where the liquid in the liquid storage container 200 is used up in the state illustrated in FIG. 8A, the liquid storage container 200 attached to the printing apparatus 100 is removed, and is replaced with a new liquid storage container 200. Specifically, the attachment and detachment of the liquid storage container 200 are generally performed at a timing at which the liquid storage container 200 is used up.

FIG. 8B illustrates a state where the liquid storage container 200 is removed from the printing apparatus 100 from the state of FIG. 8A. The arrow illustrated in a lower right portion of FIG. 8B illustrates a direction in which the liquid storage container 200 is removed from the printing apparatus 100. In the case where the liquid storage container 200 is removed from the printing apparatus 100, the coil spring 601 and the valve element 302 operate in the opposite order to that in the attachment of the liquid storage container 200. Specifically, the through hole 301 is set to the state where the valve element 302 closes the through hole 301 again.

However, even if the valve element 302 closes the through hole 301, liquid 802 remaining in the third flow passage 507*c* sometimes leaks from the gap between the hollow needle 701 and the through hole 301 in the case where the hollow needle 701 is pulled out from the through hole 301 relative thereto. Moreover, after the pull-out of the hollow needle 701 from the through hole 301, the liquid 802 remaining in the hollow flow passage 701*a* sometimes leaks from the introduction port (not illustrated) of the hollow needle 701, and drops onto an inner peripheral surface of the through hole 301. Furthermore, the liquid attached to a surface of the hollow needle 701 sometimes drops onto the inner peripheral surface of the through hole 301. In such cases, the leaking liquid 802 remains on the inner peripheral surface of the through hole 301. Then, the liquid 802 remaining on the inner peripheral surface of the through hole 301 flows out from the opening of the supply port 203 to the outside. This is because the valve element 302 closes the through hole 301, and the liquid 802 cannot return into the liquid storage container 200.

Accordingly, in the present embodiment, even in the case where the liquid flows out from the supply port 203, the liquid retaining member 204 arranged on the outer peripheral surface of the supply port 203 retains the liquid by capillary force. As illustrated in FIG. 8B, the liquid retaining member 204 extends from the opening of the supply port 203 in the opposite direction to the attachment direction, on the outer peripheral surface of the supply port 203. In the present embodiment, in comparison of the length of the liquid retaining member 204 in the attachment direction and the length of the liquid retaining member 204 in a direction intersecting the attachment direction, the length in the attachment direction is larger than the length in the direction intersecting the attachment direction. Specifically, in comparison of the length of the liquid retaining member 204 in the attachment direction (Y direction) and the length of the liquid retaining member 204 in the gravity direction (Z direction) intersecting the attachment direction, the length in the attachment direction is larger than the length in the gravity direction. This configuration causes the liquid to move toward a deeper portion in the attachment direction including many liquid movable regions and be collected.

Note that the liquid retaining member 204 is configured as follows to actively cause the liquid to move toward the deeper portion of the liquid retaining member 204 in the attachment direction. For example, the liquid retaining member 204 having a thickness that increases toward the deeper side in the attachment direction is processed into a flat structure. This causes the capillary force of the liquid retaining member 204 to be such that capillary force toward the deeper side in the attachment direction (Y direction) is greater than capillary force in the direction (Z direction) intersecting the attachment direction, and the desired movement of the liquid is made possible. Accordingly, even in the case where the liquid flows out from the supply port 203, the liquid can be pulled from a distal end region toward a deeper side region of the liquid retaining member 204 into a liquid collection region in the opposite direction to the attachment direction, and be retained by using capillary force.

Moreover, in the present embodiment, a distal end of the cover portion 205 extends (protrudes) beyond a distal end of the liquid retaining member 204 toward the distal end side in the attachment direction. The liquid retaining member 204 in the present embodiment is originally configured to be capable of absorbing all leaked liquid before the leaked liquid passes the liquid retaining member 204. However, the liquid retaining member 204 sometimes cannot absorb the leaked liquid in time due to one reason or another. Also in such a case, in the present embodiment, the distal end of the cover portion 205 extends beyond the distal end of the liquid retaining member 204 toward the distal end side in the attachment direction. Accordingly, it is possible to temporarily retain the leaking liquid by using the inner peripheral surface of the cover portion 205. Then, the liquid retaining member 204 can be made to absorb the liquid retained on the inner peripheral surface of the cover portion 205. Thus, according to such a configuration, even if the liquid retaining member 204 cannot absorb the liquid in time, the distal end of the cover portion 205 serves as a receiver of the leaked liquid, and flow out of the liquid to at least the outside of the cover portion 205 and scattering of the liquid are suppressed.

Moreover, in the case where a user touches the liquid retaining member 204 in a state where the liquid is retained in the liquid retaining member 204, there is a possibility that the liquid attaches to the hands and fingers of the user. However, the distal end of the cover portion 205 is configured to be in the extended (protruding) state, and covers the entire liquid retaining member 204. This can reduce the possibility of the user accidentally touching the liquid retaining member 204. Moreover, even in the case where the fingers, clothes, desks, walls, or the like come into contact with a distal end portion of the liquid storage container 200 removed after usage, smearing of these objects can be reduced.

Comparative Example

An effect of arranging the liquid retaining member 204 is described below by using an imaginary configuration as a comparative example to facilitate understanding of the liquid storage container 200 in the present embodiment.

Figure 9:
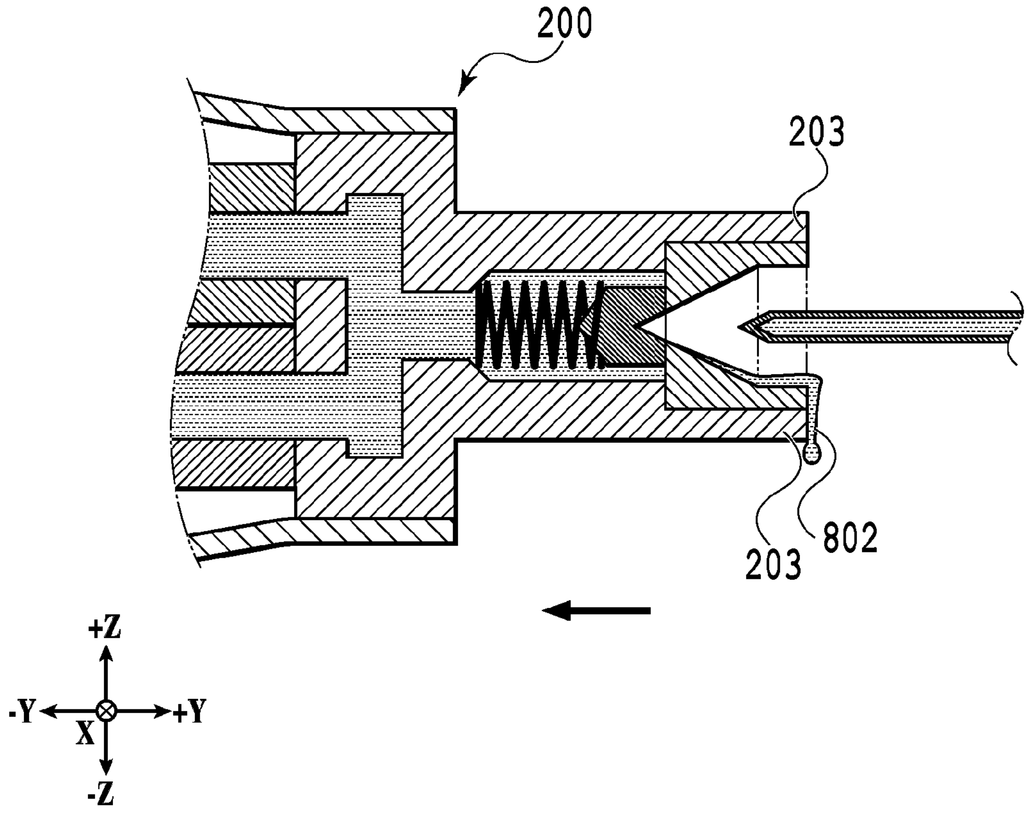
FIG. 9 is a schematic enlarged cross-sectional diagram illustrating a state where a liquid storage container in a comparative example is removed from the printing apparatus.

FIG. 9 is a schematic enlarged cross-sectional diagram illustrating a state where the liquid storage container 200 in the comparative example is removed from the printing apparatus 100. As illustrated in FIG. 9, the supply port 203 of the liquid storage container 200 in the comparative example does not include the liquid retaining member 204 or the cover portion 205. In the case where the liquid retaining member 204 is not arranged, the liquid 802 leaking in the attachment and detachment of the liquid storage container 200 flows out from the supply port 203 to the outside.

Meanwhile, in the case where the liquid retaining member 204 is arranged as in the present embodiment, even if the liquid 802 flows out, the liquid retaining member 204 can retain the liquid 802. Specifically, contamination of a surrounding environment by the leaking liquid 802 is reduced. That is the effect of arranging the liquid retaining member 204.

<Liquid Retaining Member 204>

As described above, the replacement of the liquid storage container 200 is normally performed at the timing where the liquid storage container 200 is used up. Specifically, the number of times of attachment and detachment of the liquid storage container 200 is normally one. However, the user may sometimes attach and detach the liquid storage container 200 multiple times at irregular timings due to one reason or another. Accordingly, in the present embodiment, the number of times the liquid storage container 200 is attached and detached to and from the printing apparatus 100 at irregular timings is assumed to be up to two. Specifically, in the present embodiment, the attachment and detachment is assumed to be performed total of three times (once at a normal timing and twice at the irregular timings). Accordingly, the liquid retaining member 204 in the present embodiment is configured to be capable of sufficiently absorbing the liquid even in the case where the liquid leaks three times.

In the present embodiment, one droplet of the liquid is assumed to leak in the case where the attachment and detachment is performed once. Moreover, the amount of the liquid per droplet of the liquid is assumed to be approximately 0.005 ml. In this case, the leakage amount in the present embodiment can be roughly calculated by using the following formula.

Leaking liquid amount per one time of attachment and detachment (approximately 0.005 ml)×total number of times of attachment and detachment (three times)=0.015 ml (Formula 1)

In this case, a volume of the liquid retaining member 204 capable of retaining all leaking liquid (that is approximately 0.015 ml of liquid) is approximately 24 $mm^3$. The liquid retaining member 204 that is the fibrous body can sufficiently retain the leaking liquid as long as the volume of the liquid retaining member 204 is 24 $mm^3$ or more.

An example of arrangement in the liquid retaining member 204 is described below. In the case where the outer diameter of the supply port 203 is Φ8.0 mm and the length of the supply port 203 in the attachment direction is 10.0 mm, it is preferable that the height (that is the length in the Z direction) of the liquid retaining member 204 is 1.0 mm or more and the length of the liquid retaining member 204 in the attachment direction (that is the Y direction) is 3.0 mm or more. Such arrangement can make the volume of the liquid retaining member 204 equal to or larger than approximately 24 $mm^3$. That is the description of the arrangement in the liquid retaining member 204.

<Conclusion>

As described above, the liquid retaining portion in the present embodiment is arranged in a relatively narrow region that is the outer peripheral surface of the supply port, as part of the supply port. Accordingly, compared to a conventional technique, the size of the liquid retaining portion can be reduced, and there is no need to newly prepare a region for arranging the liquid retaining portion. Thus, the technique according to the present embodiment can reduce the size and cost of the liquid storage container.

Moreover, in the present embodiment, the cover portion is arranged on the outer peripheral surface of the liquid retaining portion. Furthermore, the distal end of the cover portion extends beyond the distal end of the liquid retaining portion, toward the distal end side in the attachment direction. Accordingly, even in the case where the liquid retaining portion cannot retain the liquid as expected, it is possible to temporarily retain the liquid on the inner peripheral surface of the cover portion, and then cause the liquid retaining portion to absorb the liquid again. Thus, arranging the cover portion improves the possibility of the liquid being absorbed, from that in the case where no cover portion is arranged.

Thus, according to the liquid storage container in the present embodiment, the liquid leaking in the attachment and detachment of the liquid storage container to and from the printing apparatus can be retained with a simple, space-saving configuration. Moreover, covering the liquid retaining portion with the cover portion can reduce smearing of the hands and fingers in the attachment and detachment of the liquid storage container, from that in the case where no cover portion is arranged.

Embodiment 2

Figure 10B:
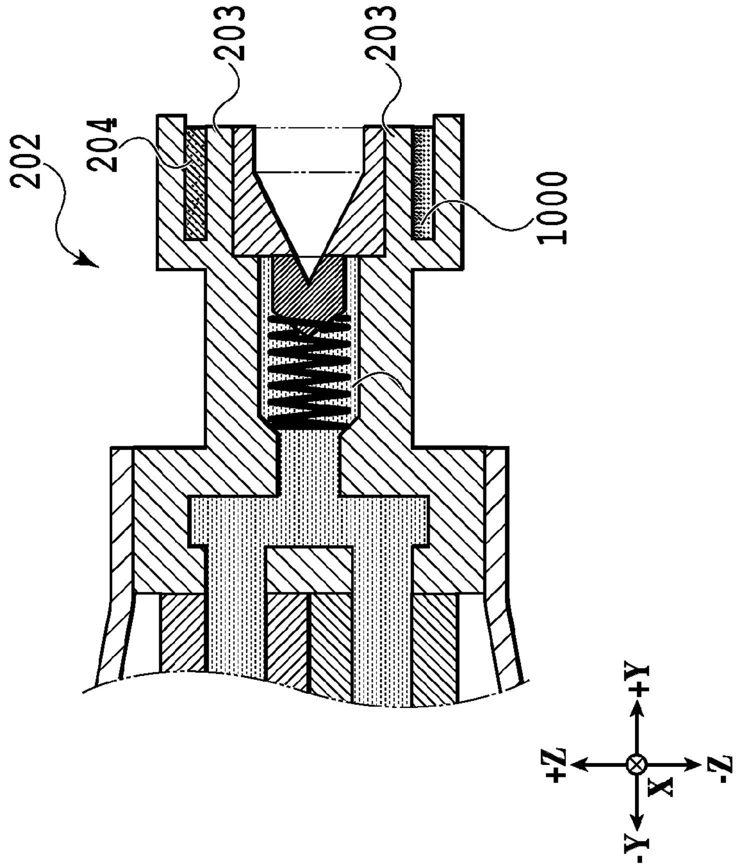
FIGS. 10A and 10B are a front diagram and a cross-sectional diagram schematically illustrating a liquid retaining portion in one embodiment.
Figure 10A:
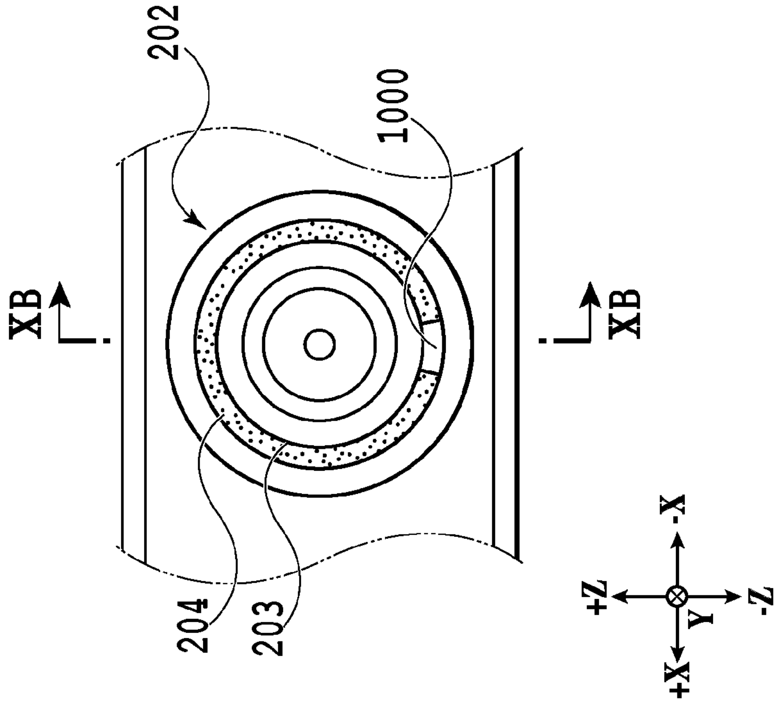

FIGS. 10A and 10B are schematic diagrams illustrating a liquid retaining portion in the present embodiment. FIG. 10A is a schematic front diagram of the supply portion 202 in the present embodiment. FIG. 10B is a schematic cross-sectional diagram along the XB-XB line in FIG. 10A. As illustrated in FIG. 10A, in the present embodiment, at least one groove 1000 is formed in a gravity direction portion of the liquid retaining portion. Note that, in the present embodiment, the groove 1000 may be also referred to as a region in which no liquid retaining member 204 is arranged. Forming the groove 1000 forms side surfaces of the liquid retaining member 204. Note that, in FIG. 10B, a cross section of the liquid retaining member 204 can be viewed on the counter-gravity direction side of the supply port 203. Meanwhile, the side surface of the liquid retaining member 204 can be viewed on the gravity direction side of the supply port 203.

In the present embodiment, an area where the liquid retaining member can come into contact with the liquid can be increased from that in the case where the liquid retaining member 204 is annularly arranged, by an amount corresponding to formation of the side surfaces of the liquid retaining member 204. Specifically, the liquid is absorbed not only from the front surface of the liquid retaining member 204, but also from the side surfaces of the liquid retaining member 204 by being pulled in along the groove 1000. Thus, according to the liquid retaining portion in the present embodiment, absorption of the liquid is facilitated from that in the configuration described in FIGS. 8A and 8B.

Embodiment 3

Figure 11B:
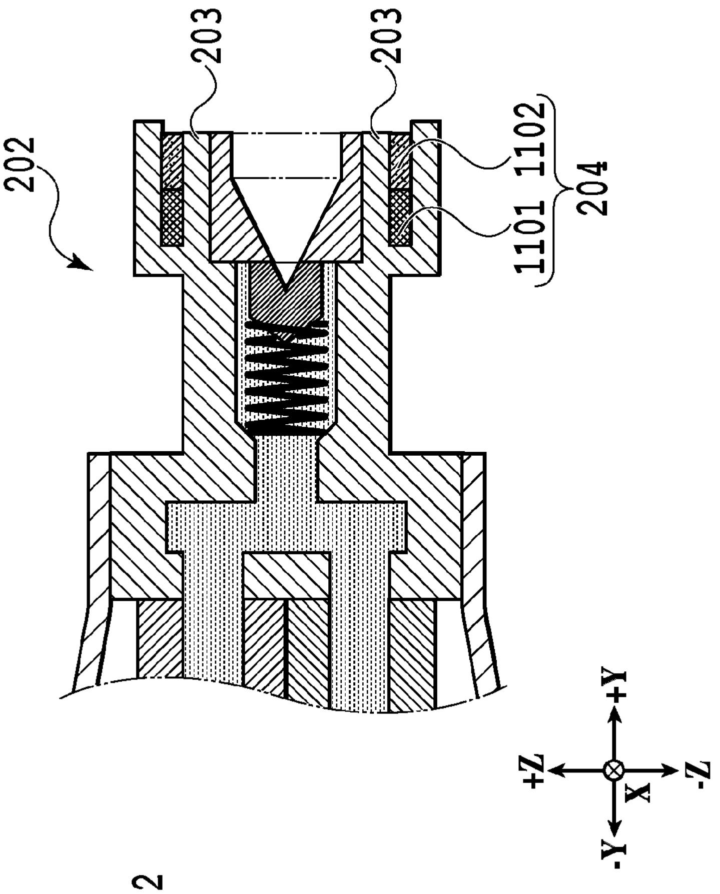
FIGS. 11A and 11B are a front diagram and a cross-sectional diagram schematically illustrating a liquid retaining portion in one embodiment.
Figure 11A:
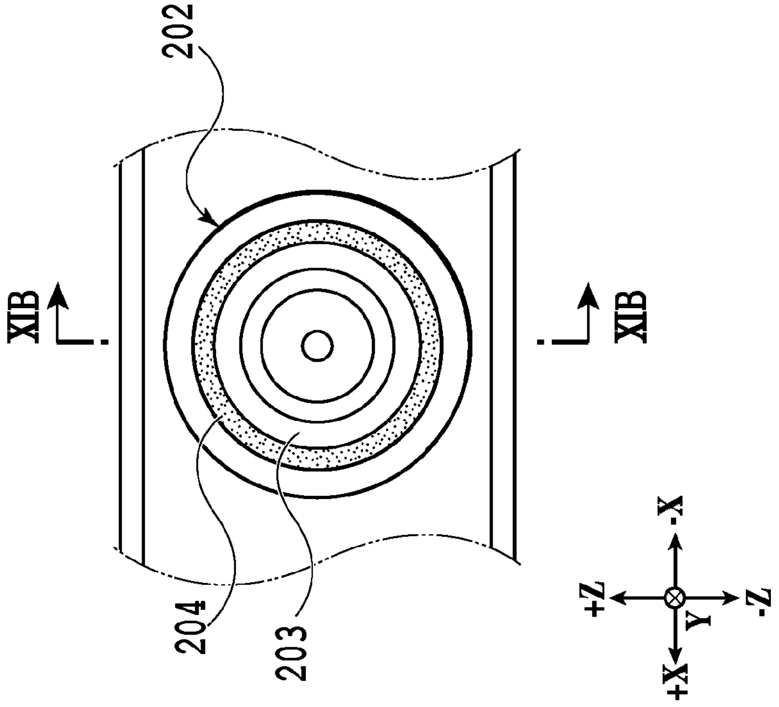

FIGS. 11A and 11B are schematic diagrams illustrating a liquid retaining portion in the present embodiment. FIG. 11A is a schematic front diagram of the supply portion 202 in the present embodiment. FIG. 11B is a schematic cross-sectional diagram along the XIb-XIb line in FIG. 11A. As illustrated in FIG. 11B, the liquid retaining member 204 in the present embodiment includes a first region 1101 and a second region 1102 continuously arranged on the distal end side of the first region 1101 in the attachment direction. A first fibrous body is arranged in the first region 1101 and a second fibrous body is arranged in the second region 1102. The first fibrous body has a higher density than the second fibrous body. Accordingly, the capillary force in the first region 1101 in which the first fibrous body is arranged is greater than that in the second region 1102 in which the second fibrous body is arranged.

In the present embodiment, the configuration may be such that the fineness of the first fibrous body is 2.5 dtex or less and the fineness of the second fibrous body is 5.0 dtex or more. As another example, the configuration may be such that the number of crimps of the first fibrous body is approximately 16 crimps/25 mm and the number of crimps of the second fibrous body is approximately 15 crimps/25 mm. As yet another example, the configuration may be such that the crimp percentage of the first fibrous body is approximately 12% and the crimp percentage of the second fibrous body is approximately 13%.

This facilitates retaining of the liquid on the based end side in the attachment direction after the absorption of the liquid. Specifically, the case where the retained liquid flows out toward the distal end side in the attachment direction can be suppressed. Thus, according to the liquid retaining portion in the present embodiment, the retainability of the liquid can be improved from that in the configuration described in FIGS. 8A and 8B. Using two fibrous bodies varying in capillary force as described above allows the liquid retaining member 204 with desired capillary force to be configured more easily than in the case of adjusting the capillary force of the liquid retaining member 204 formed of one fibrous body as described in Embodiment 1.

Embodiment 4

Figure 12B:
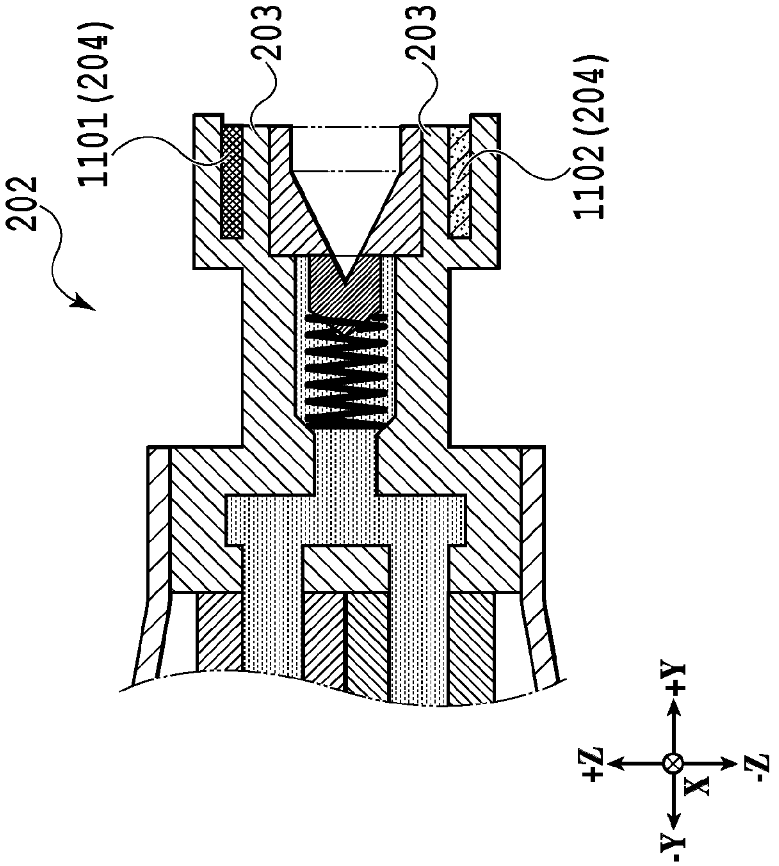
FIGS. 12A and 12B are a front diagram and a cross-sectional diagram schematically illustrating a liquid retaining portion in one embodiment.
Figure 12A:
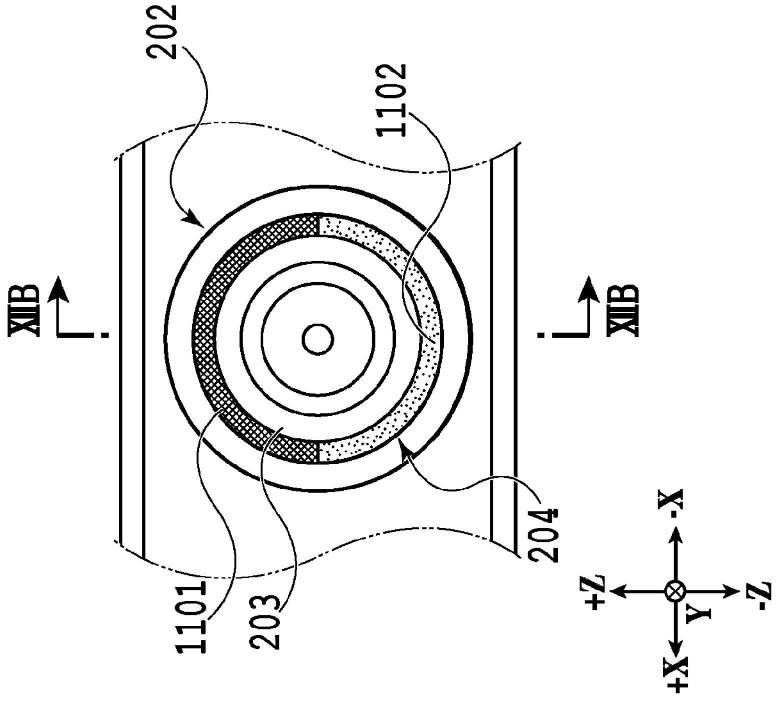

FIGS. 12A and 12B are schematic diagrams illustrating a liquid retaining portion in the present embodiment. FIG. 12A is a schematic front diagram of the supply portion 202 in the present embodiment. FIG. 12B is a schematic cross-sectional diagram along the XIIb-XIIb line in FIG. 12A. As illustrated in FIG. 12B, in the present embodiment, the second region 1102 in which the second fibrous body is arranged is located in a gravity direction portion of the liquid retaining portion. Meanwhile, the first region 1101 in which the first fibrous body having a higher density than the second fibrous body is arranged is formed continuously with the second region 1102 from the second region 1102 toward the counter-gravity direction side. Specifically, the first fibrous body is arranged on the counter-gravity direction side of the second fibrous body in a posture in attachment. Accordingly, in the liquid retaining portion in the present embodiment, the capillary force on the counter-gravity direction side is greater than the capillary force on the gravity direction side.

According to such a configuration, the capillary force causes the liquid retained in the second region 1102 to move from the second region 1102 to the first region 1101. The second region 1102 arranged on the gravity direction side can be thereby more easily maintained in a state capable of retaining the liquid. Thus, according to the liquid retaining portion in the present embodiment, the retainability of the liquid can be improved from that in the configuration described in FIGS. 8A and 8B.

Other Embodiments

The aforementioned embodiments may be carried out in any combination.

In Embodiment 1, the liquid retaining member 204 extends from the base end portion of the cover portion 205 to the distal end portion of the supply port 203 in the attachment direction. As another example of the liquid retaining member 204, the liquid retaining member 204 may extend beyond the distal end portion of the supply port 203 toward the distal end side in the attachment direction as long as smearing of the hands and fingers or unexpected liquid leakage does not become a problem. Specifically, the liquid retaining member 204 may extend up to the distal end portion of the cover portion 205 in the attachment direction. According to such a configuration, the volume of the liquid retaining member 204 is increased from that in Embodiment 1, and the amount of retainable liquid can be increased from that in Embodiment 1.

Although the liquid retaining member 204 is formed in the annular shape along the outer peripheral surface of the supply port 203 in Embodiment 1, the liquid retaining member 204 may be formed only on the gravity direction side, as long as the liquid retaining member 204 has a volume capable of sufficiently retaining the leaking liquid.

Although a bottom surface of the groove 1000 extends in the attachment direction in Embodiment 2, the bottom surface of the groove 1000 may be tilted downward while extending from the distal end side toward the base end side in the attachment direction in the posture in attachment. Such a configuration can strengthen the flow of the liquid from the distal end toward the base end in the attachment direction. The liquid is thereby more likely to be accumulated on the based end side of the groove 1000 in the attachment direction, and the retaining of the liquid is facilitated. Moreover, the surface area of the side surfaces in the liquid retaining member 204 is increased from that in Embodiment 1 by an amount corresponding to tilting of the bottom surface of the groove 1000. Accordingly, the surface area of the liquid retaining member 204 as a whole can be increased, and the absorption of the liquid is facilitated.

Although the number of the groove 1000 is one in Embodiment 2, multiple grooves 1000 may be formed. The liquid leaking in the attachment and detachment of the liquid storage container 200 drips and falls in the gravity direction by nature. However, the liquid sometimes blows out without dripping in the gravity direction due to one reason or another. Accordingly, multiple grooves 1000 are formed to enable retaining of the liquid even in the case where the liquid blows out in an unexpected direction. Moreover, in the case where there is one groove 1000, it is sometimes necessary to precisely align the liquid storage container 200 such that the opening of the groove 1000 faces the counter-gravity direction, in a manufacturing process of the liquid storage container 200. Meanwhile, in the case where there are multiple grooves 1000, it is only necessary to align the liquid storage container 200 such that the opening of any of groove portions roughly faces the counter-gravity direction side as the groove portions as a whole. Specifically, in the case where there are multiple grooves 1000, manufacturing of the liquid storage container 200 becomes easier than that in Embodiment 2, in some cases. Accordingly, it is preferable to form multiple grooves 1000 in consideration of manufacturing easiness of the liquid storage container 200.

In the technique according to the present disclosure, the liquid leaking in the attachment and detachment of the liquid storage container to and from the printing apparatus can be retained with a simple, space-saving configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2022-094125, filed Jun. 10, 2022, and No. 2023-023529, filed Feb. 17, 2023, which are hereby incorporated by reference wherein in their entirety.

What is claimed is:

1. A liquid storage container attachable to a printing apparatus, comprising:

a storage portion configured to store liquid;

a supply port configured to supply the liquid stored in the storage portion to the printing apparatus; and a liquid retaining portion configured to retain leaked liquid by using capillary force in a case where the liquid storage container is attached or detached to and from the printing apparatus, wherein the liquid retaining portion extends along an outer peripheral surface of the supply port, in an attachment direction in which the liquid storage container is attached to the printing apparatus.

2. The liquid storage container according to claim 1, wherein the capillary force of the liquid retaining portion is such that capillary force in the attachment direction is greater than capillary force in a direction intersecting the attachment direction.

3. The liquid storage container according to claim 2, wherein the capillary force of the liquid retaining portion is such that, in a posture in which the liquid storage container is attached to the printing apparatus, capillary force in an opposite direction to the attachment direction is greater than capillary force in a gravity direction or a counter-gravity direction.

4. The liquid storage container according to claim 1, wherein the liquid retaining portion includes a fibrous body.

5. The liquid storage container according to claim 1, wherein the liquid retaining portion is arranged in an annular shape along the outer peripheral surface of the supply port.

6. The liquid storage container according to claim 1, wherein an amount of the liquid retainable by the liquid retaining portion is approximately 0.015 ml or more.

7. The liquid storage container according to claim 1, wherein a volume of the liquid retaining portion is approximately 24 $mm^3$ or more.

8. The liquid storage container according to claim 1, wherein an outer periphery of the liquid retaining portion is covered with a cover portion.

9. The liquid storage container according to claim 8, wherein a distal end portion of the cover portion is located on the distal end side of a distal end portion of the liquid retaining portion in the attachment direction.

10. The liquid storage container according to claim 1, wherein the liquid retaining portion includes one or more grooves extending in the attachment direction.

11. The liquid storage container according to claim 10, wherein, in a posture in attachment, a bottom surface of the groove is tilted downward while extending from the distal end side toward the base end side in the attachment direction.

12. The liquid storage container according to claim 1, wherein the liquid retaining portion includes a first region in which a first fibrous body is arranged, and a second region in which a second fibrous body different in density from the first fibrous body is arranged.

13. The liquid storage container according to claim 12, wherein a first fibrous body has a higher density than the second fibrous body, and is arranged on the based end side of the second fibrous body in the attachment direction.

14. The liquid storage container according to claim 12, wherein a first fibrous body has a higher density than the second fibrous body, and is arranged on the counter-gravity direction side of the second fibrous body in a posture in attachment.

15. The liquid storage container according to claim 12, wherein a fineness of the first fibrous body is 2.5 dtex or less, and a fineness of the second fibrous body is 5.0 dtex or more.

16. The liquid storage container according to claim 12, wherein the number of crimps in the first fibrous body is approximately 16 crimps/25 mm, and the number of crimps in the second fibrous body is approximately 15 crimps/25 mm.

17. The liquid storage container according to claim 12, wherein a crimp percentage of the first fibrous body is approximately 12%, and a crimp percentage of the second fibrous body is approximately 13%.

18. A printing apparatus comprising:

a liquid supply unit to which liquid is supplied from a liquid storage container including: a storage portion configured to store liquid; a supply port configured to supply the liquid stored in the storage portion to the printing apparatus; and a liquid retaining portion to retain leaked liquid by using capillary force in a case where the liquid storage container is attached or detached to and from the printing apparatus, wherein the liquid retaining portion extends along an outer peripheral surface of the supply port, in an attachment direction in which the liquid storage container is attached to the printing apparatus;

a connection portion configured to connect the supply port in the liquid storage container; and a printing unit configured to perform printing by using the liquid supplied from the liquid storage container via the connection portion.

* * * * *